United States Patent
Panizzolo

(12) 
(10) Patent No.: US 6,506,138 B2
(45) Date of Patent: Jan. 14, 2003

(54) COMPACT BRAKING ASSEMBLY IN AN AXLE FOR AN INDUSTRIAL VEHICLE

(75) Inventor: Fabrizio Panizzolo, Padova (IT)

(73) Assignee: Dana Italia S.p.A., Arco (IT)

( * ) Notice: Subject to any disclaimer, the term of this patent is extended or adjusted under 35 U.S.C. 154(b) by 0 days.

(21) Appl. No.: 09/875,737

(22) Filed: Jun. 6, 2001

(65) Prior Publication Data

US 2001/0053730 A1 Dec. 20, 2001

(30) Foreign Application Priority Data

Jun. 9, 2000 (IT) .......................... MI00A1294

(51) Int. Cl.[7] .............................. F16H 48/20
(52) U.S. Cl. ........................................ 475/86
(58) Field of Search ................. 192/220, 221; 475/86

(56) References Cited

U.S. PATENT DOCUMENTS

| | | | | |
|---|---|---|---|---|
| 3,642,103 A | * | 2/1972 | Schott ......................... | 192/4 A |
| 3,994,375 A | * | 11/1976 | Stritzel ........................ | 192/4 A |
| 4,113,044 A | * | 9/1978 | Williams et al. ............... | 180/51 |
| 5,323,890 A | * | 6/1994 | Okada ......................... | 192/4 R |
| 5,673,776 A | * | 10/1997 | Fitch et al. .................. | 192/4 A |

* cited by examiner

Primary Examiner—Dirk Wright
(74) Attorney, Agent, or Firm—Hedman & Costigan, P.C.

(57) ABSTRACT

A compact braking assembly in an axle for an industrial vehicle comprising, within an internal body (10) which extends in an arm (18), supported in a rotatable manner (in 16, 17) a casing (14) of a differential (15) provided with a first set of disks (20, 21), with a second set of disks (46, 47) also positioned between the casing (14) and said arm (18) of the axle, with a piston (41) acting on the first set of disks (20, 21), operated by a fluid fed from a respective duct (43), which axially moves a ring (44), distributor of an operating force of the piston (41), in which the piston (41) successively positions the first set of disks (20, 21) in a pack acting as a differential lock, subsequently positioning the second set of disks (46, 47) in a pack acting as a service brake thanks to the presence of a pre-established preloaded elastic element (24).

8 Claims, 4 Drawing Sheets

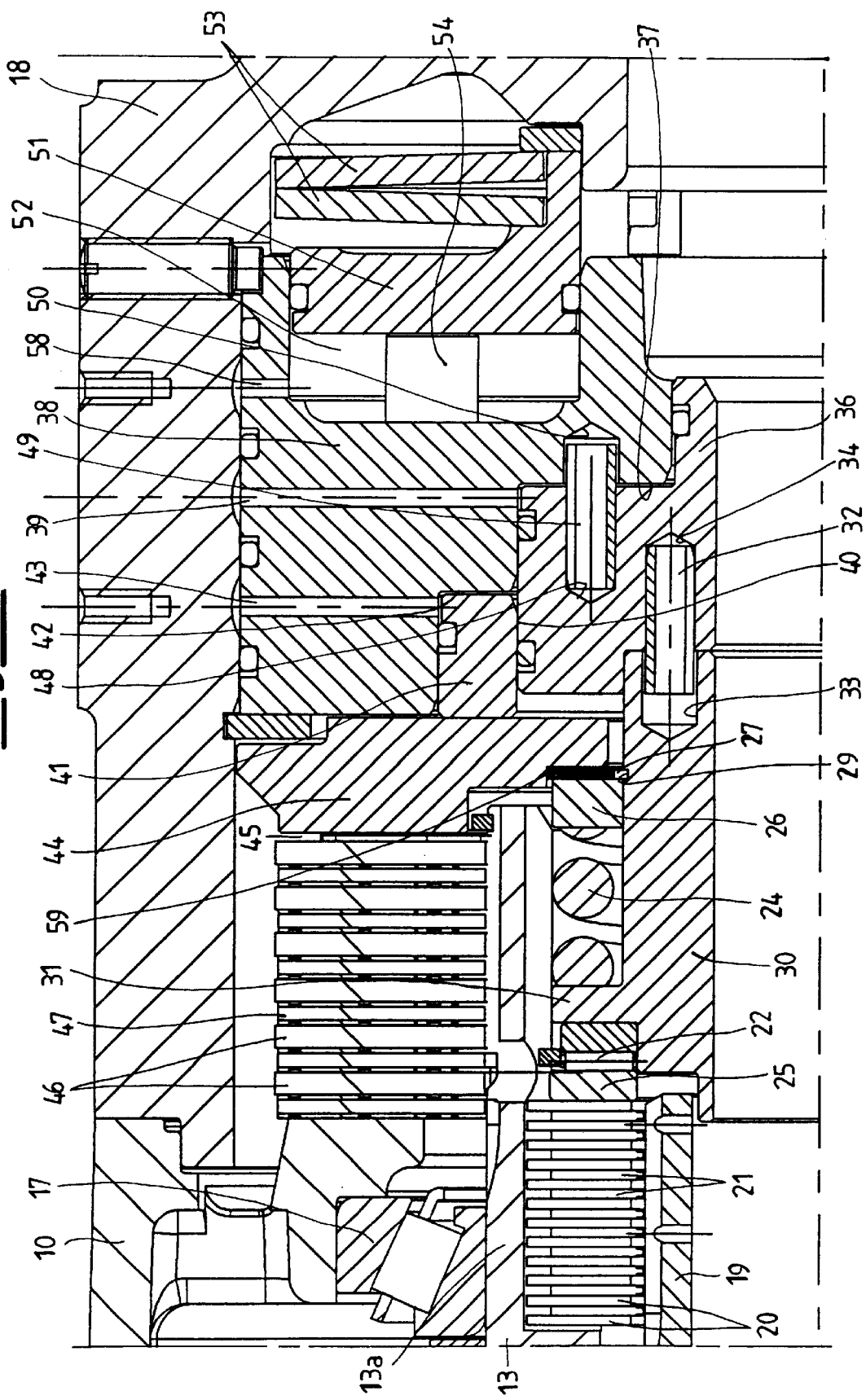

COMPACT BRAKING ASSEMBLY IN AN AXLE FOR AN INDUSTRIAL VEHICLE

BACKGROUND OF THE INVENTION

The present invention relates to a compact braking assembly in an axle for an industrial vehicle.

In known industrial vehicles the braking assembly positioned in line with an axle is placed in a form divided to the right and left in relation to the two differential outlets. In particular layouts, both brakes can also incorporate a so-called "negative pressure control" emergency braking device, namely operated positively by elastic elements when there is no pressure in the circuit of the vehicle.

Operation of each separate braking assembly mentioned above is determined by a relevant actuator provided specifically and connected to the relevant assembly. For this purpose, the at least two actuatators of the two braking assemblies must necessarily be correlated to one another to obtain the required and desired operation.

The general object of the present invention is to produce a braking assembly in an axle for an industrial vehicle which reduces to a minimum the control actuators mentioned above, without damaging the operation of this braking assembly.

Specifically, an object of the present invention is to produce a particularly compact braking assembly, which can be positioned in an axle for an industrial vehicle in concentrated spaces and with a practical and functional layout of the respective actuators.

Another object of the present invention is to produce a compact braking assembly in an axle for an industrial vehicle which, if requested, can also be provided with an emergency/parking braking assembly defined as "negative pressure control".

SUMMARY OF THE INVENTION

These objects according to the present invention are achieved by producing a compact braking assembly in an axle for an industrial vehicle as set forth in claim 1.

Further characteristics of the invention are indicated in the subsequent claims.

BRIEF DESCRIPTION OF THE DRAWINGS

The characteristics and advantages of a compact braking assembly in an axle for an industrial vehicle according to the present invention shall be more apparent in the description below, provided as a non-limiting example, referring to the annexed schematic drawings, in which:

FIG. 2a is an enlarged detail of the sectional view in FIG. 2,

DETAILED DESCRIPTION OF THE INVENTION

Figure 1:
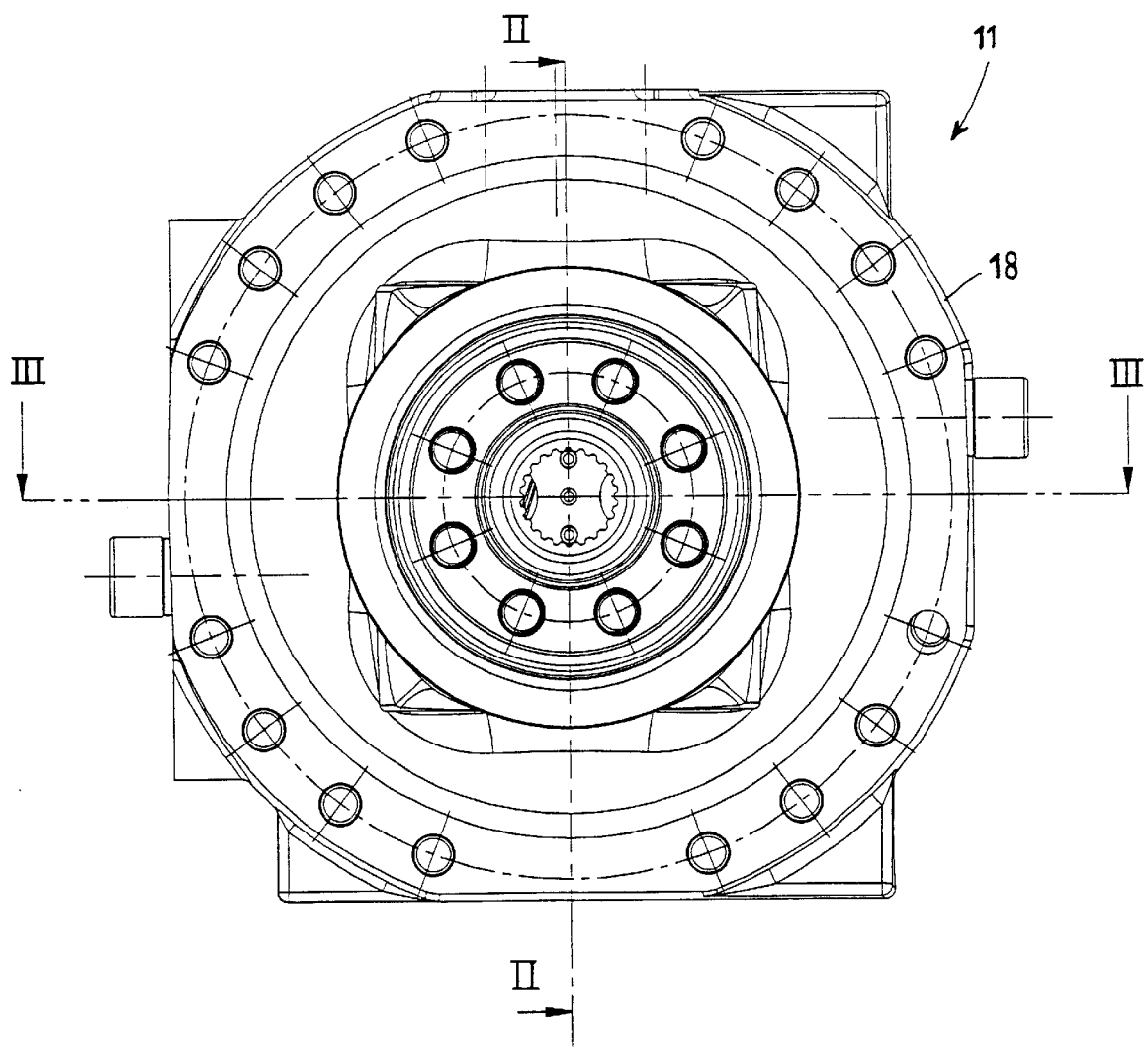
FIG. 1 is a transverse view of an axle for industrial vehicle equipped with a braking and locking assembly according to the invention.
Figure 2:
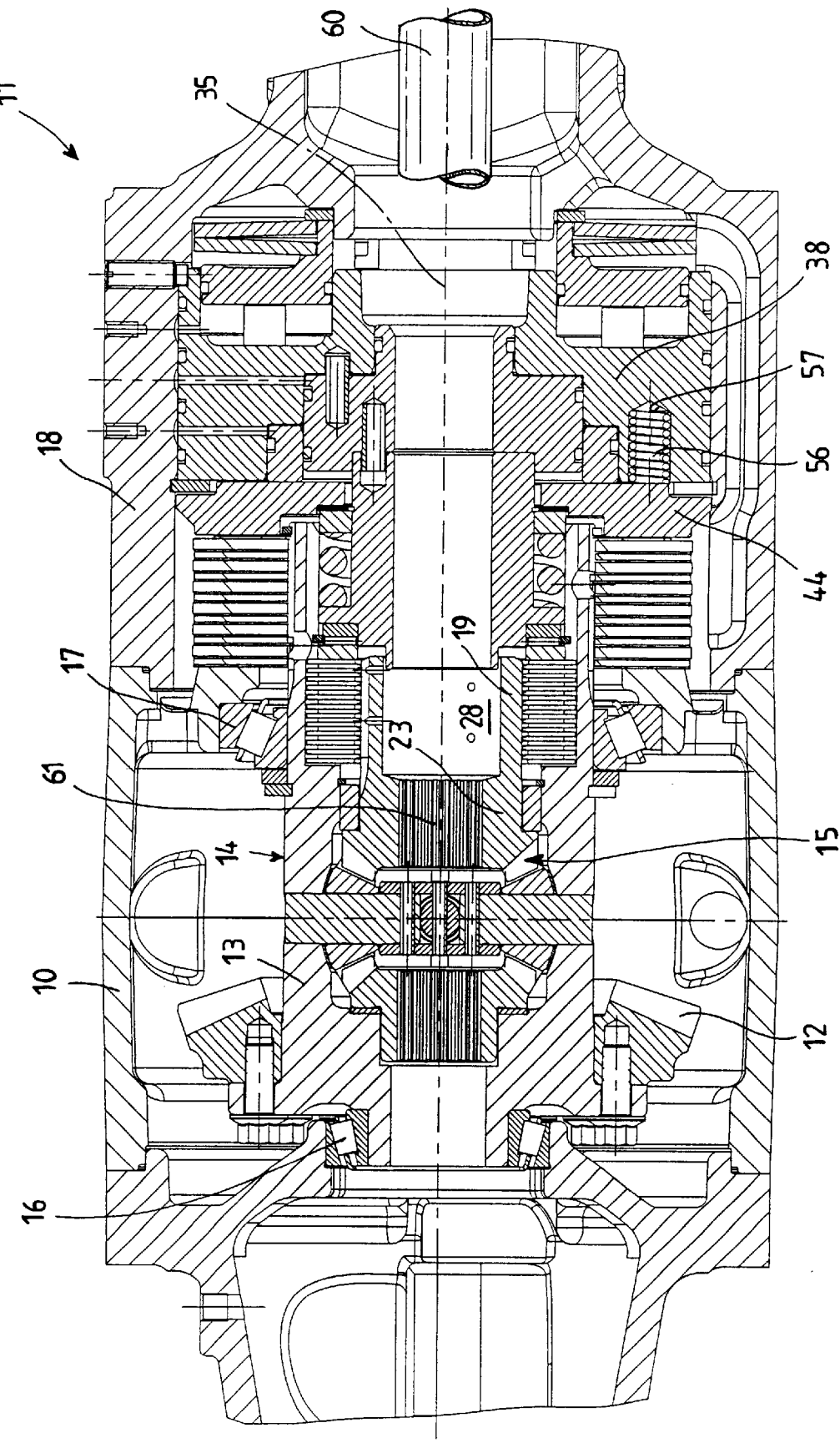
FIG. 2 is a sectional view in a reduced scale according to the line II—II in FIG. 1.
Figure 3:
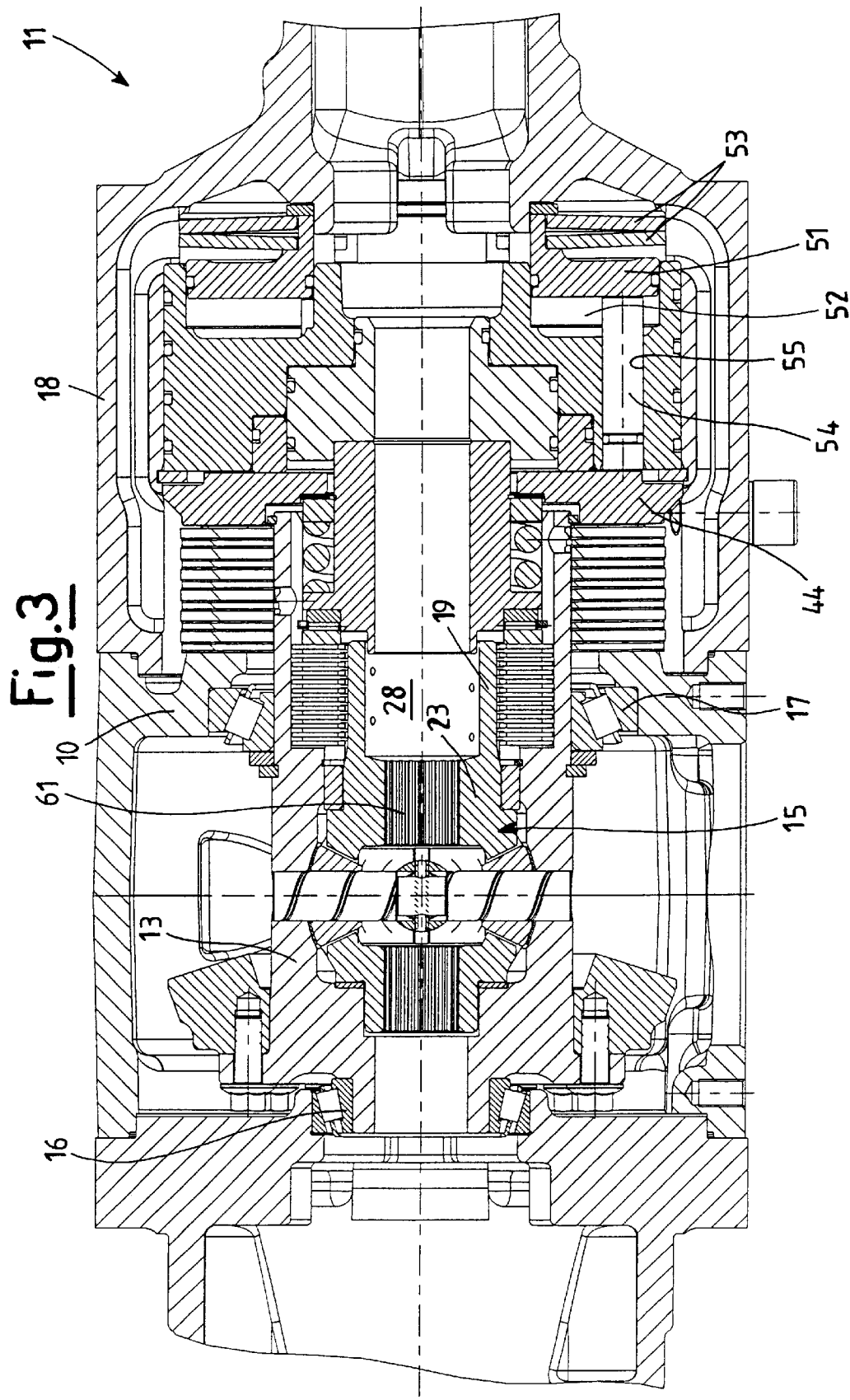
FIG. 3 is a sectional view in reduced scale according to the line III—III in FIG. 1.

With reference to the figures, a compact braking assembly is shown positioned in an axle for an industrial vehicle according to the present invention indicated as a whole with 11.

The axle 11 receives the command to rotate from a toothed bevel control pinion (not shown) which is engaged with a ring bevel gear 12 integral with an external part 13 of a casing 14 of a differential 15. Axle shafts, only partly shown and schematised in 60, receive motion through a terminal part with surface splines (not shown) which engages in splined seats 61 of the differential 15.

The casing 14 of the differential 15 is positioned rotating on tapered bearings 16 and 17, positioned opposite one another and positioned inside a body 10 of the axle 11 which extends in an arm 18.

Positioned on a cylindrical extension 19 of a side gear 23 of the differential 15, positioned integrally by means of a splined coupling is a set of disks 20 which extend radially outwards, suitable to interact with another set of disks 21, in an oil bath in the form of a hydraulic clutch.

The second set of disks 21 which extend radially inwards, rotate together with a cylindrical extension 13a of the outer part 13 of the casing 14. A shoulder ring 25 is positioned with one of its faces at the end of the pack of disks 20, 21 and the other face, facing outwards, is in contact with an axial roller-bearing fifth wheel 22.

An elastic element, such as a spiral spring 24, is positioned between an axial lock ring 27 with relevant spring resting disk 26 and a radial flange extension 31 of a locking sleeve 30 of the differential. The axial lock ring 27 is integral inside a seat 29 provided on the external surface of the sleeve 30. The spring 24 is positioned with established preload equivalent to the maximum axial force required to generate the differential lock torque. In any case, during normal operation, the extension 31 holds back the spring 24 so that it cannot act on the disks 20 and 21, which are free to rotate in relation to each other. In other words, the preload of the spring closes in this condition on the sleeve 30 between the extension 31 and the spring resting disk 26 locked against the axial lock ring 27.

As stated, coaxially to the cylindrical extension 19 of the internal part of the differential 15, in a hollow internal zone of this 28, the aforesaid sleeve 30 is provided. On the opposite side from the one on which the disks 20 and 21 are positioned, coupling pins 32, fitted in dead holes 33, 34 with a parallel axis to a central axis 35 of axle rotation make the sleeve 30 integral with a piston 36 to control differential locking. Moreover, to the rear of the piston 36 dead holes 48 are provided to receive pins 49 which slide in dead holes 50 of a cylindrical ring 38 integral with the arm 18 connected to the body 10 of the axle. In this way, the piston 36 can translate but cannot rotate in its operating layout. In fact, the piston 36 slides in a chamber 37 positioned inside a cylindrical ring 38 integral with the arm 18 of the axle and fed with fluid by means of a duct 39.

It must also be noted that an external front part of the piston 36 is guided and slides on an internal surface 40 of another piston 41, under the form of cylindrical ring. Positioned between the front part of the distributor disk 44 and the spring resting disk 26 are adjusting shims 59 to establish a pre-selected clearance and operating delay between differential locking and service brakes locking. In fact, this piston 41 has the function of simultaneously controlling differential locking (by means of the interposed elastic element 24) and, after compacting of the differential locking assembly with relevant elastic yield of the spring 24 above the preload force and the actual braking operation of the axle. The piston 41 is also fitted inside a chamber 42 identified by another lowered portion of the ring 38 integral with the arm 18 of the axle. The chamber 42 is also fed with fluid by means of a duct 43.

The front this other piston 41 faces a cylindrical ring 44, also acting to distribute thrust, sliding coaxially in relation to the sleeve 30, and when off spaced by a certain distance 45 in relation to a second pack of disks for service braking. The ring 44 is also maintained normally in contact with the adjusting shims 59 thanks to the presence of other elastic elements 56, positioned in dead holes 57 provided in the ring 38 integral with the arm 18 of the axle, which act on the rear surface of said ring 44.

Moreover, two other sets of disks 46 and 47 are fitted positioned between the arm 18 of the axle 11 and the cylindrical extension 13a of the external part 13 of the casing 14. These two other sets of disks 46 and 47 operate once the piston 41 has positioned the first set of disks 20 and 21 in a pack.

To summarise, the ring 44, when operating on both packs of disks 20, 21 and 46, 47 acts as a ring distributing the force of actuation transmitted from the piston of the service brake.

To the rear of the ring 38 integral with the arm 18 of the axle 11 it is possible to provide, on specific request from the user, a so-called "negative pressure control" emergency braking assembly. It will be seen that this assembly is operated positively by elastic elements when there is no pressure in the circuit of the vehicle.

In fact, this emergency braking assembly comprises a third piston 51 that can slide inside a cylindrical cavity 52, provided at the rear inside the ring 38 integral with the arm 18 of the axle 11. The piston 51 is generally subjected to pressurised fluid from the internal control circuit of the vehicle that enters from a duct 58 in the cavity or chamber 52 and overcomes the elastic force of the Belleville washer 53, holding the piston 51 in this position. When there is no pressure of this fluid in the cavity 52, the elastic force of the springs 53 is released and moves the piston 51 to the opposite part to provide total safety locking of the axle 11.

The piston 51 rests on three or more pins gauged in length 54, only one of which is shown, guided to slide inside holes 55 provided in the ring 38, which act at the rear of the cylindrical ring 44, said pins 54 being equipped with appropriate seal, such as an 0 ring. Thus, also in this manner, when there is no pressurised fluid of the internal control circuit of the vehicle, the piston 51 is moved and a locking action is performed both on the disks 20, 21 of the differential and the disks 46, 47 of the service brake, thus complying with the current safety regulations when parking the vehicle.

Operation of the braking assembly of the present invention is implemented as follows.

The situation at rest is illustrated in the figures and permits complete transmission of motion between the differential 15 and the axle shafts 60.

During service braking, fluid is fed from the duct 43 to the chamber 42 to establish movement of the piston 41.

The piston 41 moves and shifts the ring 44 which acts on the adjusting shims 59 which in turn move the spring 24 resting disk 26. The spring 24 acts on the extension 31 and thus forces the disks 20 and 21 into a pack, locking the differential. Immediately afterwards, following elastic yield of the spring 24, the ring 44 fills the space 45 left as clearance between it and the set of disks 46 and 47, also moving this set of disks into a pack, performing the actual service braking of the axle.

The space 45 provides the clearance which establishes the pre-selected delay in operation between differential locking and service brake locking.

However, if locking or braking of the differential only is desired, fluid must be fed to the duct 39 and then to the chamber 37. The fluid moves the piston 36 which performs movement during actuation of the sleeve 31 with consequent movement of the disks 20 and 21 into a pack and with differential braking.

As stated, if there is no pressurised fluid of the control circuit of the vehicle, the piston 51 is stressed by the springs 53 and in any case determines movement of the ring 44 with complete locking of the differential and braking of the axle.

The invention thus solves all problems related to prior art braking assemblies.

Advantageously, a braking assembly according to the invention is fitted on only one side of the differential to minimize connections and pipes to control the various braking functions and differential locking.

This assembly is particularly compact and multifunctional and suitable to be fitted in a modular manner, for example without fitting the other emergency braking lock assembly, if it is not requested.

Although with the same performance or functions of the dual brake provided on known axles, it is particularly compact and simplified.

The interposition of the preloaded spring also permits differentiated wear through time between the two disk packs, making it possible to eliminate separate and non-separate systems to adjust the two disk packs.

Another advantage is that the invention permits symmetrical axle shafts, thanks to the geometry of the assembly.

What is claimed is:

1. Compact braking assembly in an axle for an industrial vehicle comprising an internal body (10) that extends within an arm (18) of a casing (14) of a differential (15), supported in a rotatable manner (16, 17) provided with a first set of disks (20, 21), with as second set of disks (46, 47) also positioned between said casing (14) and said arm (18) of the axle, with a piston (41) acting on said first set of disks (20, 21), actuated by a fluid fed by a respective duct (43), which axially moves a ring (44), distributor of an operating force of said piston (41), in which said piston (41) successively positions said first set of disks (20, 21) in a pack acting to lock said differential and subsequently positions said second set of disks (46, 47) in a pack which acts as a service brake because of the presence of a pre-established preloaded elastic element (24).

2. Braking assembly as claimed in claim 1, characterised in that fitted coaxially to said piston (41) is another piston (36), operated by a fluid fed from another duct (39) which acts solely on said first set of disks (20, 21) to. apply a braking force only to the differential assembly.

3. Braking assembly as claimed in claim 1, characterised in that said preloaded elastic element is composed of a spring (24) positioned coaxially to a sleeve (30) to lock the differential (15).

4. Braking assembly as claimed in claim 3, characterised in that said spring (24) is positioned between a radial flanged extension (31) of said sleeve (30) and a resting disk (26) that can be shifted on one side towards said extension (31) and locked on the other by an axial locking ring (27) fitted in a seat (29) provided on an external surface of the sleeve (30).

5. Braking assembly as claimed in claim 4, characterised in that positioned between said extension (31) and said disks (20, 21) is a shoulder ring (25), acting on said disks (20, 21) and an axial roller-bearing fifth wheel (22) acting on said extension (31).

6. Braking assembly as claimed in claim 1, characterised in that adjusting shims (59) are provided in the off position, positioned between said ring (44) and a resting disk (26) of said elastic element (24), to establish a pre-selected clearance (45) and delay in operation between differential (15) locking and service brake locking.

7. Braking assembly as claimed in claim 1, characterised in that to the rear of a cylindrical ring (38) integral with said arm (18) of the axle another piston (51) is positioned, operated, only if there is no pressurised fluid for vehicle control, to act on said ring (44) to lock said differential (15) and said service brake, by means of elastic elements (53).

8. Braking assembly as claimed in claim 7, characterised in that said elastic elements are Belleville washers (53) and that said piston (51) acts on several pins gauged in length (54), guided to slide inside holes (55) provided in said ring (38), which act to the rear of said cylindrical ring (44).

* * * * *